(12) United States Patent
Schmidt

(10) Patent No.: US 6,595,467 B2
(45) Date of Patent: Jul. 22, 2003

(54) AIRCRAFT FUSELAGE SHELL COMPONENT WITH CRACK PROPAGATION RESISTANCE

(75) Inventor: Hans-Juergen Schmidt, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 138 days.

(21) Appl. No.: 09/727,830
(22) Filed: Nov. 30, 2000

(65) Prior Publication Data
US 2002/0000492 A1 Jan. 3, 2002

(30) Foreign Application Priority Data
Jun. 28, 2000 (DE) .......................................... 100 31 510

(51) Int. Cl.⁷ ................................................ B64C 1/00
(52) U.S. Cl. ...................................... 244/119; 244/132
(58) Field of Search ................................ 244/119, 120, 244/125, 132, 133; 428/98, 221; 29/897.2

(56) References Cited

U.S. PATENT DOCUMENTS

| | | | | |
|---|---|---|---|---|
| 2,689,698 A | * | 9/1954 | Agnew ........................ 244/123 |
| 3,201,862 A | | 8/1965 | Gotoh | |
| 3,995,081 A | * | 11/1976 | Fant et al. ................... 428/119 |
| 5,841,098 A | | 11/1998 | Gedrat et al. | |
| 5,842,317 A | | 12/1998 | Pettit | |
| 5,893,534 A | * | 4/1999 | Watanabe ................... 244/119 |
| 6,328,260 B1 | * | 12/2001 | Tarbox et al. .............. 244/131 |
| 6,364,250 B1 | | 4/2002 | Brinck et al. | |

FOREIGN PATENT DOCUMENTS

| | | |
|---|---|---|
| DE | 19639667 | 3/1998 |
| DE | 19844035 | 11/1999 |
| DE | 19924909 | 6/2000 |

OTHER PUBLICATIONS

U. S. Patent Application Publication 2001–038057A1, Nov. 8, 2001.

* cited by examiner

Primary Examiner—J. Woodrow Eldred
(74) Attorney, Agent, or Firm—W. F. Fasse; W. G. Fasse

(57) ABSTRACT

When stiffening members, such as stringers and frame members, are welded onto a skin sheet to form an aircraft fuselage shell, a crack originating in the skin sheet tends to propagate through the weld joints into the stiffening members. In order to prevent crack propagation into a stiffening member, the stiffening member is reinforced with a web doubler plate or a tension band made of high strength steel or titanium alloys or fiber-reinforced composites. The doubler plate is riveted or adhesively bonded onto a stiffening member web, or the tension band is crimped into the stiffening member web. The resulting fuselage shell structure has crack stopping properties and thus an increased residual strength, so it can be used with welded joints at all areas of the fuselage shell, including the top and sides as well as the bottom of the fuselage.

36 Claims, 3 Drawing Sheets

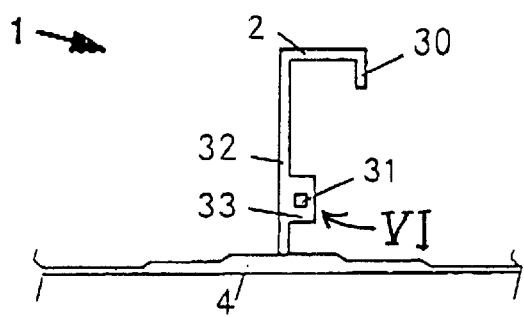
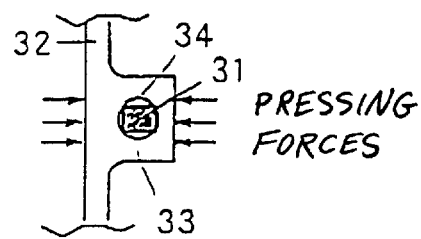
Fig. 5              Fig. 6
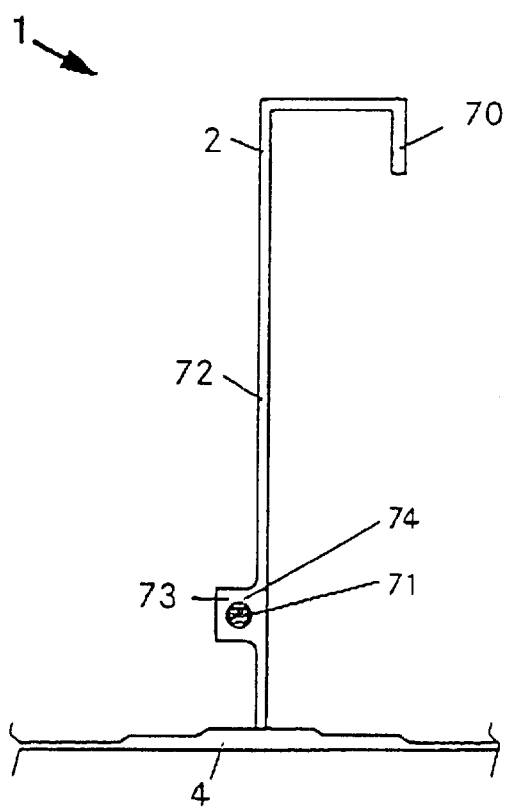
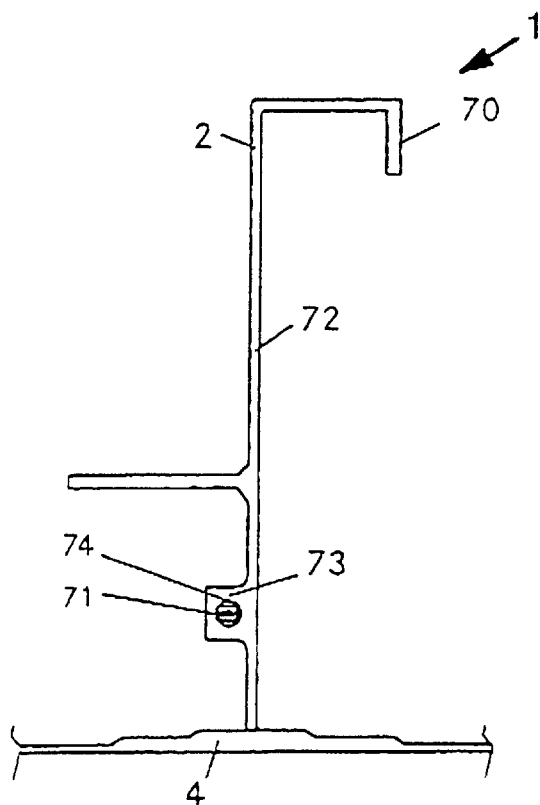
Fig. 7              Fig. 8

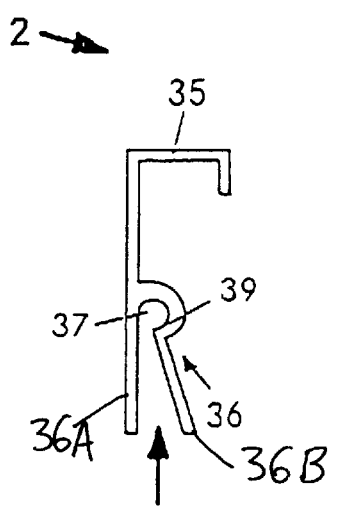
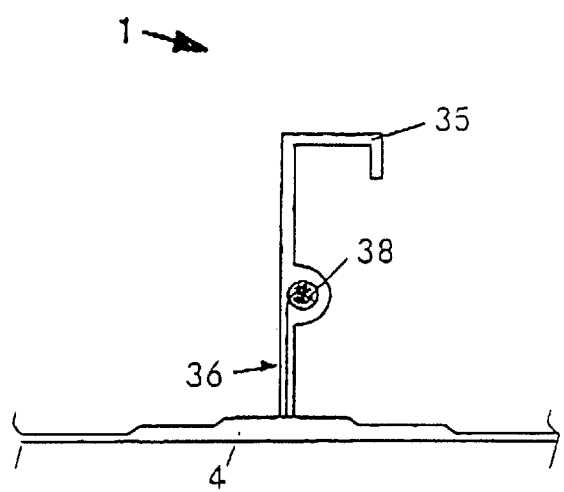
Fig. 9                              Fig. 10

AIRCRAFT FUSELAGE SHELL COMPONENT WITH CRACK PROPAGATION RESISTANCE

PRIORITY CLAIM

This application is based on and claims the priority under 35 U.S.C. §119 of German Patent Application 100 31 510.0, filed on Jun. 28, 2000, the entire disclosure of which is incorporated herein by reference.

FIELD OF THE INVENTION

The invention relates to a structural component and particularly a fuselage shell component for an aircraft, including a skin sheet and several stiffening profile members connected to the skin sheet at least partially by welding.

BACKGROUND INFORMATION

In the construction of aircraft fuselages, it has become known to connect the stiffening profile members, such as frame members and stringers, to the outer fuselage skin by means of welding, at least partially or at certain locations of the aircraft. For example, see German Patent Publication DE 196 39 667 and corresponding U.S. Pat. No. 5,841,098, or German Patent Publication DE 198 44 035. Particularly, the stringers and frame members are welded onto large format skin sheets by means of laser beam welding, so as to fabricate structural components in the form of fuselage shell components that are assembled together to form the fuselage of the aircraft.

Such fuselage shell components must have a sufficient strength and stiffness to support the ordinary operating loads applied to the aircraft fuselage, as well as extreme loads applied under unusual conditions, and a further safety margin or safety factor beyond such loads. Particularly in the future, fuselage shell components will have to satisfy a so-called "two bay crack" criteria. Namely, the fuselage shell structure will have to be able to withstand a longitudinally or circumferentially extending crack that spans or extends over two frame sections or two stringer sections (i.e. the crack extends into two bays), without resulting in a failure of the overall shell structure. In this context it is further to be assumed that the stiffening profile member at the middle of the crack is broken. Thus, the remaining structure of the fuselage shell must be able to withstand the requisite loads, without failing.

In the previously typical construction, the stiffening profile members, such as frame members and stringers, were connected to the skin sheets by riveting or adhesive bonding. Such a joining method of the stiffening profile members onto the skin sheets is disadvantageous in comparison to laser welding, because the riveting and adhesive bonding result in a greater total weight, and involve greater costs and efforts in the fabrication procedures. On the other hand, the structure resulting from such rivet connections or adhesive bonding of the stiffening profile members onto the skin sheets provides a greater residual strength and a better crack stopping characteristic (i.e. resistance to crack propagation) than a corresponding shell structure in which the stiffening profile members have been laser welded onto the skin sheets.

Particularly, with a riveted or adhesively bonded junction between the skin sheets and the stiffening profile members, a crack that initiates in the skin sheet and progresses to a location of a stiffening profile member will generally not propagate into the stiffening profile member itself, because the rivets or adhesives do not provide the necessary degree of local force coupling to transmit the crack into the stringer or frame member. Thus, while the crack in the skin sheet might propagate past the location of a stringer or frame member, it does not directly damage the associated stringer or frame member. Therefore, the respective stringer or frame member maintains its original strength and holds together the skin sheet through the rivets or adhesive on opposite sides of the crack, thereby inhibiting the propagation of the crack.

The respective stiffening profile member is able to maintain this condition for a certain number of load alternations, until the extra loading transmitted from the skin into the stiffening profile member eventually fatigues and overloads the profile member, leading to a failure of the respective stiffening profile member. At that point, the fuselage skin and the affected stiffening profile member will fail, typically in a sudden rupturing manner, which leads to a failure of the fuselage shell structure. However, the fact that the stiffening profile member maintains its integrity and load-carrying ability even after a crack has formed in the adjoining skin sheet, generally allows the aircraft to fly safely to a landing, whereupon the crack defect in the skin sheet can be detected and repaired.

The above described advantageous property of crack propagation resistance or inhibition is not generally achieved by fuselage shell structures in which the stiffening profile members are welded onto the skin sheets. Namely, with such a welded junction, any crack that forms in a skin sheet and propagates to the junction of a stiffening profile member will directly propagate through the welded joint into the stiffening profile member, where the crack will then propagate further into or even entirely through the stiffening profile member. Since there is no effective interruption between the skin sheet and the stiffening profile member, there is no "crack stopping" effect which would prevent the crack from propagating into the respective stringer or frame member. As a result, any crack in the skin sheet will readily propagate through the stringers and frame members as well, which leads to a significantly lower residual or remaining strength of the overall fuselage shell structure upon the occurrence of such a crack. Namely, once such crack forms, it will readily propagate through both the skin and the stiffening profile members, and there is no structural component remaining to hold together the fuselage shell at the location of the crack, thus leading to a failure of the overall shell structure.

In view of the above, the shell structure components would have to be thickened and thereby strengthened in areas of the aircraft fuselage in which the post-crack residual strength is the predominant design criterium, in order to achieve an adequate residual strength in such areas. These areas especially include the sides and the upper or top portion of the fuselage, since these areas are especially subjected to tension loads during operation, with a consequent tendency toward crack opening and propagation. Such thickening of the fuselage shell in these areas would, however, lead to an unacceptable increase in the overall weight of the fuselage. For these reasons, prior aircraft fuselages have not used welded stringers in these areas at the sides and top of the fuselage, but instead have only used welded stringers, for example, in the bottom or belly of the fuselage, while using riveted or adhesively bonded stringers on the sides and top of the fuselage.

German Patent DE 199 24 909 has further disclosed a fuselage shell component in which each stiffening profile member includes an integral thickening at a location adjacent to the base or root of the profile member at which the profile member is welded onto a skin sheet. The ratio of the thickness of this thickening or protruding portion of the profile member relative to the thickness of the root of the profile member that is welded onto the skin sheet is at least two to one. The protruding portion or thickening is an integrally formed portion of the same material as the rest of the profile member. The object of this thickened portion or protrusion is to stop the propagation of any crack that might progress from the skin sheet through the welded junction into the base or root of the profile member. Thus, even if the crack propagates into the base or root of the profile member, it shall not propagate further beyond the thickened protrusion into the rest of the profile member. This provides a crack propagation stopping characteristic as well as an improved residual strength of the fuselage shell structure after a crack has formed in the skin. While such an integral protrusion or thickening of the stiffening profile member aims to provide a certain degree of crack stopping performance, it has been found that further improvements are possible.

SUMMARY OF THE INVENTION

In view of the above, it is an object of the invention to provide a shell structural component and particularly an aircraft fuselage shell component that has an increased residual strength after a crack has formed in the skin thereof, under consideration of a minimum structural weight of the shell component. It is a further object of the invention to provide a shell component with stiffening profile members welded onto the skin thereof that is suitable for use in all locations of the aircraft fuselage, including the sides and the top of the fuselage shell. The invention further aims to avoid or overcome the disadvantages of the prior art, and to achieve additional advantages, as apparent from the present specification.

The above objects have been achieved according to the invention in a structural shell component for an aircraft fuselage, comprising a skin sheet as well as plural stiffening profile members such as stringers or frame members, whereby the stiffening profile members are at least partially joined to the skin sheet by means of welding. Particularly according to the invention, non-unitary or non-integral strengthening elements are arranged on and secured to the stiffening profile members, before the stiffening profile members are welded onto the skin sheet. Each of these strengthening elements is a separate, non-integral component relative to the stiffening profile member onto which it is secured, and preferably consists of a different material than the stiffening profile member. In this manner, the strengthening and crack stopping effect of the strengthening elements can be optimized or maximized, without unacceptably increasing the weight or the costs of the finished structure. In other words, the strengthening members can consist of material that is stronger and lighter, but more costly, than that of the stiffening profile members, for example.

Further, preferably, the strengthening elements are secured to the stiffening profile members by a non-integral connection method, or joining method, such as riveting or adhesive bonding. Such a non-integral connection provides the crack stopping interruption that is necessary for preventing a crack from propagating into the strengthening elements or thereby also further into the stiffening profile members. Namely, if a crack propagates through the welded joint from the skin sheet into the stiffening profile member, it will not further propagate through the riveted or adhesive joint into the strengthening element or elements. Thereby the strengthening element or elements will maintain its strength intact and hold together the stiffening profile member at the location of the crack, which will inhibit the further propagation of the crack in the stiffening profile member.

According to preferred embodiments of the invention, the strengthening elements may be in the form of doubling or reinforcing members that are secured to the webs of the respective stiffening profile members, or alternatively the strengthening elements may comprise tension bands or cables that are secured to the stiffening profile members so as to extend along the respective length thereof.

The inventive shell structure achieves the advantage that the residual or remaining strength of the shell structure after a crack has formed in the skin thereof, is sufficient so that the welded shell component can also be used in the side and top areas of an aircraft fuselage. Thus, it becomes possible to use such welded fuselage shell components for the entire fuselage of an aircraft, so that the use of riveted and adhesively bonded joints between the stringers or frame members and the fuselage skin can be avoided, in all areas of the aircraft rather than only the lower belly of the fuselage. In this manner, the overall production effort, costs and structural weight can be significantly reduced in comparison to the use of conventional adhesively bonded or riveted shell components.

Moreover, the inventive provision of a two-part, non-integral structure of separate strengthening elements secured onto the stiffening profile members achieves additional advantages over the prior art provision of an integral thickening or protrusion adjacent to the base of each stiffening profile member. Namely, the use of separate or discrete strengthening elements allows the strengthening elements to be made of a different material than that of the stiffening profile members, which allows a greater strength and a greater strength-to-weight ratio to be achieved, without excessively increasing the costs. Also, the strengthening elements may be arranged with an oriented characteristic, for example, in the manner of a tension band or cable that extends along the length of the respective stiffening profile member, so as to exert its strongest retaining forces in a direction that is most effective for holding together the respective stiffening profile member across a crack, in the event a crack should propagate into the stiffening profile member. The non-integral joint between the respective strengthening element and the stiffening profile member provides better crack stopping isolation to prevent the further propagation of a crack through or beyond such a joint.

The inventive structure has thus solved or overcome all of the prior art disadvantages of welded shell components, including those that arise when using stiffening profile members having thickened portions along the roots or bases thereof. If a primary crack develops in the fuselage skin, this crack might propagate through the welded joint into the stiffening profile members, but there the crack propagation will be delayed or entirely stopped by the strengthening elements arranged according to the invention on the stiffening profile members. This in turn has the effect of stopping or hindering the propagation of the crack further in the fuselage skin. The structure of interconnected frame members and stringers remains substantially intact and maintains its strength, so that the residual or remaining strength after the initiation of a crack in the fuselage shell is increased.

BRIEF DESCRIPTION OF THE DRAWINGS

In order that the invention may be clearly understood, it will now be described in connection with example embodiments, with reference to the accompanying drawings, wherein:

FIG. 1 is a schematic cross-section through a structural component according to a first embodiment of the invention, in the area of a stringer welded onto a skin sheet;

FIG. 2 is a schematic cross-section similar to that of FIG. 1, but showing a second embodiment;

FIG. 5 is a schematic cross-section generally similar to that of FIG. 1, but showing the area of a stringer according to a third embodiment;

FIG. 6 is an enlarged detail of the detail area VI indicated in FIG. 5;

FIG. 7 is a schematic cross-section generally similar to that of FIG. 3, but showing the inventive structural component in the area of a frame member according to a third embodiment;

FIG. 8 is a schematic cross-section generally similar to that of FIG. 4, but showing the inventive structure in the area of a frame member according to the third embodiment;

FIG. 9 is a schematic cross-section of the starting condition of a stiffening profile member to be used according to the invention in a fourth embodiment; and FIG. 10 is a schematic cross-section showing the finished structural component according to the invention in the area of the stiffening profile member according to FIG. 9.

Figure 3:
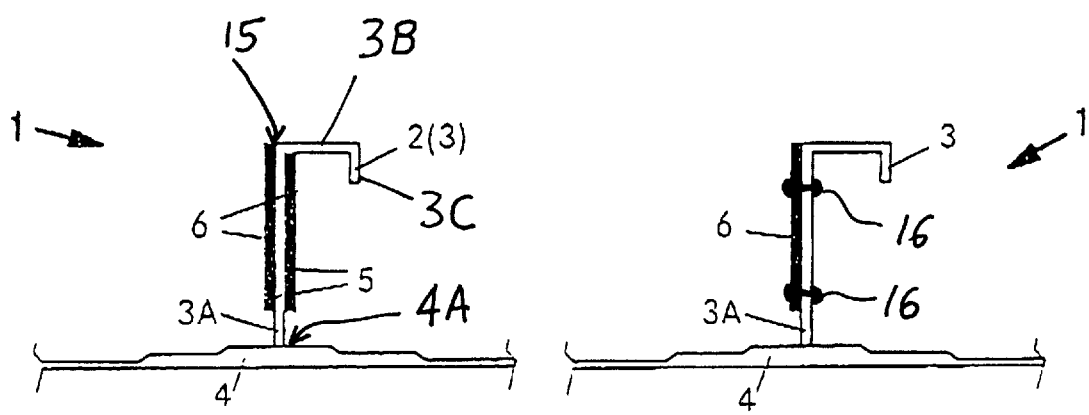
FIG. 3 is a schematic cross-section of a structural component according to a first embodiment of the invention, in the area of a frame member welded onto a skin sheet.

DETAILED DESCRIPTION OF PREFERRED EXAMPLE EMBODIMENTS AND OF THE BEST MODE OF THE INVENTION

FIGS. 1 and 2 each respectively show a portion of a structural shell component and particularly a fuselage shell component 1 in the area at which a stiffening profile member 2 is welded onto a fuselage skin sheet 4. Particularly in FIGS. 1 and 2, the stiffening profile member 2 is a stringer 3 that runs in the aircraft longitudinal direction of the aircraft fuselage structure. The overall structural shell component 1 to be used as a fuselage shell of an aircraft includes a plurality of such stringers 3 respectively extending in the aircraft longitudinal direction and spaced apart from one another in the aircraft circumferential direction. Generally, the stiffening profile members 2 could be stringers, frame members, ribs, spars, etc.

The connection between each stringer 3 and the skin sheet 4 is achieved by means of welding, such as laser beam welding, or according to any other conventionally known technique, for example as disclosed in the German Patent Publications 196 39 667 or 198 44 035 as mentioned above. Such a welded joint 4A between the stringers 3 and the skin sheet 4 allows a simpler and more economical fabrication, and additionally achieves a weight reduction in comparison to the prior typical methods using rivets or adhesive for joining stringers onto the skin sheets.

In order to increase the residual or remaining strength of such a welded structural shell component 1 in the event a crack forms in the skin sheet 4, each stringer 3 is strengthened by at least one strengthening element 5 according to the invention. Particularly, the stringers 3 are provided with the strengthening elements 5 before the stringers are welded onto the skin sheet or sheets 4. Each stringer 3 in this example includes a stringer main web 3A, a flange web 3B, and a rim web 3C. The strengthening elements 5 in the present embodiment are preferably lengthwise extending doubling or reinforcing members 6. At least one of these doubling members 6 is secured onto at least one side of the stringer main web 3A in order to "double" or reinforce this web. While FIG. 2 shows an embodiment with only one lengthwise extending doubling member 6 secured onto one side of the stringer main web 3A, FIG. 1 shows an embodiment in which two doubling members 6 are respectively secured onto the opposite sides of the stringer main web 3A. Depending on the remaining strength of the structural shell component that is to be achieved, or depending on the arising loads, one or more lengthwise doubling members 6 can be used as necessary, in either the arrangement shown in FIG. 2 or the arrangement shown in FIG. 1.

The doubling members 6 preferably consist of a high strength aluminum alloy or of fiber reinforced metal laminates including plural layers of metal and of reinforcement fibers. In the illustrated embodiment of FIGS. 1 and 2, the doubling members 6 are configured as a simple rectangular sectional member such as an ∥-profile member. The respective doubling members 6 are secured onto the sides of the stringer main webs 3A by means of adhesive bonding 15 or riveting 16, which is carried out before the reinforced stringers 3 are then welded onto the skin sheet 4. In this context, these stringers 3 may consist of any material that is conventionally used for such stringers in aircraft construction, and the adhesive bonding or riveting of the doubling members 6 onto the stringers 3 can be carried out by any conventional riveting or adhesive bonding techniques using any conventionally known materials for such joining methods in the field of aircraft construction.

The present invention is very simple to incorporate into existing methods of aircraft construction, because the doubling members 6 are simply pre-secured onto the stringers 3 and then the reinforced stringers 3 may be handled in the usual manner for being welded onto the skin sheet 4. This is simply achievable, because in comparison, it would be very difficult and costly to secure strengthening members onto the structural shell component 1 after the stringers and frames had been welded onto the skin, especially in the context of a large format component.

Figure 4:
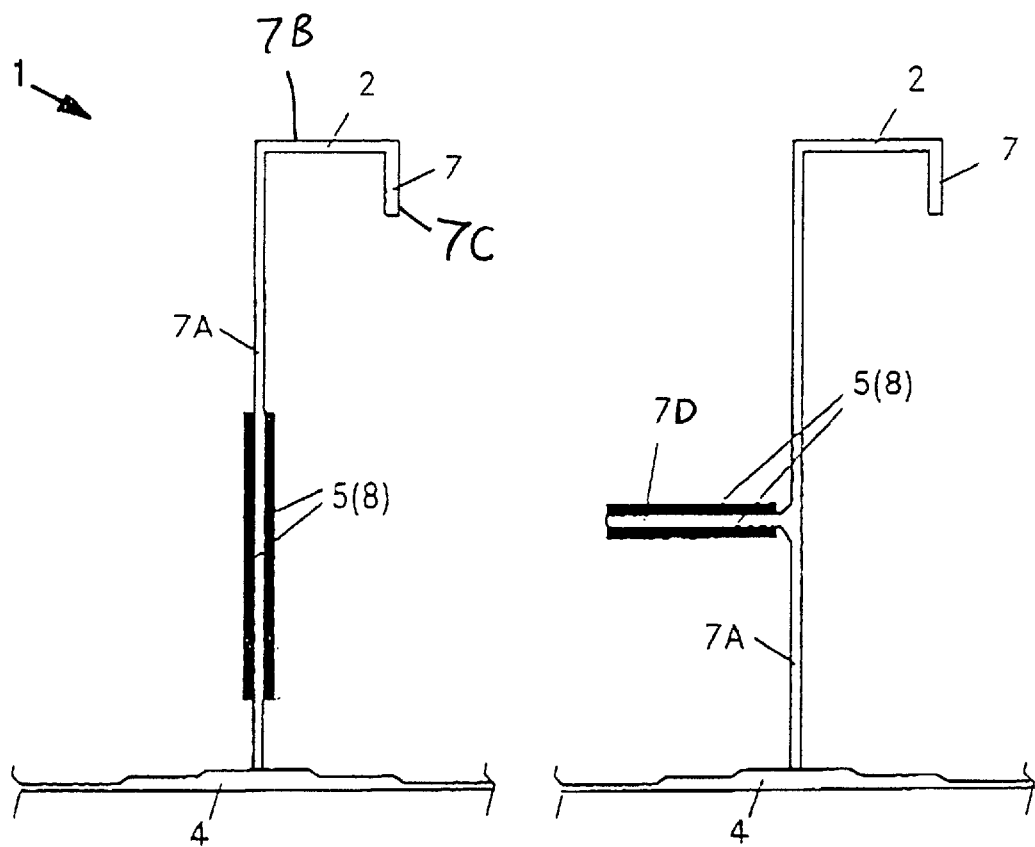
FIG. 4 is a schematic cross-section similar to that of FIG. 3, but showing a structural component in the area of a frame member according to a second embodiment.

FIGS. 3 and 4 respectively show portions of the structural shell component 1 in the area of a frame member 7 that extends in the circumferential direction of the aircraft fuselage. Thus, in the present context, the stiffening profile member 2 is embodied as a circumferential frame member 7 which is welded onto the skin sheet 4. According to the invention, strengthening elements 5 embodied as circumferentially extending doubling members 8 are arranged on one side or on both sides of the frame member main web 7A, while the frame member 7 further includes a flange web 7B and a rim web 7C. Particularly, FIG. 3 shows an arrangement in which respective circumferentially extending doubling members 8 are glued or riveted onto both opposite sides of the frame member main web 7A. On the other hand, FIG. 4 shows an arrangement in which the frame member 7 includes an additional web 7D that protrudes perpendicularly from the main web 7A, and the two circumferentially extending doubling members 8 are secured onto the two opposite sides of this additional web 7D.

It is apparent that the strengthening elements 5 in the form of doubling members 8 can be arranged at any portion or location of the frame member 7, depending on the profile shape of the frame member 7 or generally the stiffening profile member 2, and depending on the particular loading characteristic that will be applied to the stiffening profile member. Similarly as mentioned above in connection with the stringers 3, the gluing or riveting of the circumferential doubling members 8 onto the frame member 7 is carried out before welding the frame member 7 onto the skin sheet 4.

FIG. 5 to 8 show a structural shell component 1 with a further embodiment of the reinforcement or strengthening of the stiffening profile members 2 in order to achieve an increase in the residual strength of the welded shell structure. Particularly, FIGS. 5 and 6 show an embodiment of a stringer 30 that is strengthened by a tension band or tension cable 31, which preferably consists of high strength steel or titanium alloys or fiber reinforced composite materials. The tension band 31 is arranged to extend along the length of the stringer web 32, i.e. in the aircraft longitudinal direction. More particularly, the stringer web 32 has a material thickening or thickened portion 33 protruding from one side thereof, with a through hole 34 extending in the stringer lengthwise direction in this thickened portion 33, for receiving the tension band 31 therein. Preferably, the thickened portion 33 is provided in the lower half of the stringer web 32, i.e. closer to the root or base along which the stringer 30 is welded to the skin sheet 4. Alternatively, the tension band could be arranged in respective thickened portions on both opposite sides of the respective stiffening profile member.

The tension band 31 preferably has a polygon cross-sectional shape, and is inserted into the through hole 34 and then twisted so that the tension band 31 becomes engaged with the wall of the through hole 34. For this reason, square or rectangular cross-sectional shapes of the tension band 31 are preferably used, so that the angular edges of the tension band 31 can become engaged in the through hole 34 as mentioned above. This ensures that a relative sliding or shifting of the tension band 31 within the through hole 34 and relative to the thickened portion 33 is prevented, in the event of a crack forming and propagating into the base area of the stringer 30. Thus, the tension band 31, which remains intact and unaffected by the crack, holds together the material thickened portion 33 on the opposite sides of the crack and thereby hinders further propagation of the crack.

To enhance this effect of the securing or bonding between the tension band 31 and the stringer 30, the complete stringer 30 is heat treated, for example by a solution annealing process, in order to improve the deformability of the material, and then lateral clamping or pressing forces are applied to the thickened portion 33 as indicated in FIG. 6, in order to deform the thickened portion 33 and achieve a form-locked connection between the tension band 31 and the thickened portion 33. In effect, the thickened portion 33 is positively crimped onto the tension band 31.

FIGS. 7 and 8 generally relate to an embodiment using a tension band similarly to FIGS. 5 and 6, but in particular show a tension band 71 arranged in a frame member 70. Similarly as described above in connection with FIGS. 5 and 6, a tension band 71 consists of high strength steel or titanium alloys or fiber reinforced materials, and is arranged in a through hole 74 extending in the frame member lengthwise direction (i.e. the aircraft circumferential direction) in a material thickened portion 73 protruding from one side of the frame member web 72, and preferably on a lower half thereof closer to its base or root that is welded to the skin sheet 4. The tension band 71 preferably has a polygon cross-section, for example a quadrangular or square cross-section. When the tension band 71 is inserted into the through-hole 74 and then twisted, the tension band 71 becomes engaged in the through hole 74, so as to prevent a relative shifting or displacement of the material thickened portion 73 relative to the tension band 71, in the event that a crack propagates into the base of the frame web 72 and the thickened portion 73. The entire frame member 70 is heat treated, for example preferably by a solution annealing process, and then the thickened portion 73 is pressed or crimped as described above in connection with FIG. 6 in order to achieve a form-locking connection between the thickened portion 73 and the tension band 71.

FIGS. 9 and 10 show a further advantageous embodiment of a reinforced stiffening profile member 2 for a structural shell component 1 having an increased residual strength according to the invention. In this embodiment, the stiffening profile member 2 is a special stringer 35 that includes a split or slitted web 36 including two web legs 36A and 36B at the base or root end of the stinger that will be welded onto the skin sheet 4. A receiver opening 37 for receiving a tension band 38 therein is provided at the end of the split or opening of the split web portion 36 where the two web legs join each other. FIG. 9 shows the stringer 35 in its starting configuration before the insertion of the tension band 38 therein. The split web portion 36 is configured so as to form a clamp including the receiver opening 37 into which the tension band 38 is inserted. To insert the tension band 38, it must be pushed past a protruding edge of material 39 along the mouth of the receiver opening 37, so that the tension band 38 is forcefully clipped into place and held in position in the receiver opening 37 by the protruding edge or lip of material 39.

The tension band 38 preferably has a substantially round cross-section and is provided with a roughened outer surface. While other cross-sectional shapes of the tension band 38 are also useable, a round cross-section is preferred because it can be easily and economically fabricated, and is also readily available in the form of tension cables or the like. The provision of a roughened surface is one possibility in order to hinder or prevent the relative movement between the tension band 38 and the stringer 35, to delay or prevent the propagation of a crack further through the stringer 35 in the manner described above. The tension band 38 may be made of the above mentioned high strength steel or titanium alloys or fiber-reinforced composite materials.

After the tension band 38 has been pressed into the receiver opening 37, then the stringer 35 is subjected to a heat treatment, such as a solution annealing treatment, in order to improve the deformability of the material. After the annealing step, the split-open web portion 36 is pressed closed, thereby tightly clamping and pressing the receiver opening 37 around the tension band 38, so as to achieve a form-locking or crimped connection of the tension band 38 within the stringer 35. Thereafter, the finished stringer 35 can be welded onto the skin sheet 4 in a substantially conventional manner. The resulting finished arrangement of the stringer 35 with the tension band 38 clampingly held therein, and being welded onto the skin sheet 4 is shown in FIG. 10.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. While it is not expressly stated in the above description, it should be understood that the inventive reinforcement can be provided for all of the stiffening profile members of a fuselage shell, or only for each alternating second stiffening profile member, for example, depending on the overall strength requirements of the finished fuselage shell. In some applications, an adequate overall residual strength might be achieved by providing the inventive reinforcement for only some of the stringers and frame members, especially at critical locations.

What is claimed is:

1. An aircraft fuselage structural shell component comprising:
    a skin sheet;
    a plurality of stiffening profile members arranged and joined onto said skin sheet, at least partly by respective weld joints, and wherein said stiffening profile members each extend lengthwise in a lengthwise direction of said stiffening profile members and each respectively comprise at least one profile member web; and
    a plurality of strengthening elements that respectively extend continuously in said lengthwise direction along respective ones of said profile member webs, and that are respectively non-integrally secured onto said respective profile member webs, and that are respectively discrete non-integral components relative to said profile member webs with respective non-integral boundary interfaces therebetween adapted to hinder any crack formed in said skin sheet or said profile member webs from propagating into said strengthening elements so that said strengthening elements respectively hold together said stiffening profile members even if one or more cracks form in said stiffening profile members.

2. The aircraft fuselage structural shell component according to claim 1, wherein said stiffening profile members comprise stringers extending in an aircraft longitudinal direction and frame members extending perpendicularly to said stringers in an aircraft circumferential direction.

3. The aircraft fuselage structural shell component according to claim 1, wherein said strengthening elements comprise reinforcing doubler elements that are arranged and secured respectively onto at least one side of each of said respective ones of said profile member webs.

4. The aircraft fuselage structural shell component according to claim 3, further comprising at least one of rivets and an adhesive arranged to secure said reinforcing doubler elements onto said profile member webs.

5. The aircraft fuselage structural shell component according to claim 3, wherein said reinforcing doubler elements consist of a different material than said profile member webs.

6. The aircraft fuselage structural shell component according to claim 3, wherein said reinforcing doubler elements consist of one of a high strength aluminum alloy and a fiber-reinforced metal laminate.

7. The aircraft fuselage structural shell component according to claim 3, wherein said reinforcing doubler elements respectively have an ‖-profile cross-section.

8. The aircraft fuselage structural shell component according to claim 1, wherein said strengthening elements comprise tension bands that are arranged and secured respectively onto said respective ones of said profile member webs.

9. The aircraft fuselage structural shell component according to claim 8, wherein said respective ones of said stiffening profile members each respectively further comprise a thickened material portion that integrally protrudes laterally outwardly from at least one side of said profile member web thereof, and wherein a respective one of said tension bands is received and secured in each respective one of said thickened material portions.

10. The aircraft fuselage structural shell component according to claim 9, wherein said thickened material portions respectively have through-holes therein, and said tension bands are received and secured in said through-holes.

11. The aircraft fuselage structural shell component according to claim 8, wherein each of said respective ones of said profile member webs is a respective split web including two web legs joined to each other while forming an opening therebetween, and wherein said tension bands are received and secured in said openings of said split webs.

12. The aircraft fuselage structural shell component according to claim 8, wherein said tension bands respectively have a polygon cross-section.

13. The aircraft fuselage structural shell component according to claim 8, wherein said tension bands respectively have a round cross section.

14. The aircraft fuselage structural shell component according to claim 8, wherein said tension bands respectively have a roughened outer surface.

15. The aircraft fuselage structural shell component according to claim 8, wherein said tension bands respectively are twisted along their lengths.

16. The aircraft fuselage structural shell component according to claim 8, wherein said tension bands consist of a different material than said respective ones of said profile member webs.

17. The aircraft fuselage structural shell component according to claim 8, wherein said tension bands consist of at least one of high strength steel alloys, titanium alloys, and fiber-reinforced composite materials.

18. A method of making the aircraft fuselage structural shell component of claim 1, comprising the following steps:
    a) arranging and securing said strengthening elements onto said respective ones of said profile member webs, so as to make stiffening profile structures that each respectively include at least one of said strengthening elements secured onto said profile member web of a respective one of said stiffening profile members; and
    b) after said step a), joining said stiffening profile structures onto said skin sheet by welding respective roots of said stiffening profile members onto said skin sheet.

19. The method according to claim 18, wherein said step of securing said strengthening elements comprises at least one of riveting and adhesively bonding said strengthening elements onto said respective ones of said profile member webs.

20. The method according to claim 18, further comprising:
    a preliminary step of fabricating said stiffening profile members to include said profile member webs and respective thickened material portions that integrally protrude laterally outwardly from at least respective first sides of said profile member webs; and
    another preliminary step of providing said strengthening elements as respective tension bands; and
    wherein said step of securing said strengthening elements comprises arranging and fixing said tension bands in said thickened material portions.

21. The method according to claim 20, further comprising forming through-holes in said thickened material portions, and wherein said step of arranging said tension bands in said thickened material portions comprises inserting said tension bands into said through-holes.

22. The method according to claim 21, wherein said step of securing said tension bands in said thickened material portions comprises twisting said tension bands after said inserting of said tension bands into said through-holes.

23. The method according to claim 18, further comprising:

a preliminary step of fabricating said stiffening profile members so that said profile member webs are respective split webs that each include two web legs joined to each other while forming an opening therebetween, and another preliminary step of providing said strengthening elements as respective tension bands; and wherein said step of securing said strengthening elements comprises inserting and securing said tension bands into said openings between said two web legs of said split webs.

24. The method according to claim 18, further comprising a preliminary step of providing said strengthening elements as respective tension bands; and wherein said step of securing said strengthening elements onto said respective ones of said profile member webs comprises pressing and crimping said profile member webs onto said tension bands so as to establish a form-locked connection between said tension bands and said profile member webs.

25. The method according to claim 18, further comprising heat treating said stiffening profile structures by a solution annealing process.

26. A stiffening profile structure for an aircraft fuselage shell component, comprising:

a stiffening profile member that extends lengthwise in a lengthwise direction of said stiffening profile member, and that includes at least one profile member web; and at least one strengthening element that extends continuously in said lengthwise direction along said profile member web, and that comprises a discrete non-integral component relative to said profile member web with a non-integral boundary interface therebetween adapted to hinder any crack formed in said profile member web from propagating into said strengthening element so that said strengthening element holds together said stiffening profile member even if one or more cracks form in said stiffening profile member, wherein said discrete non-integral component is a component selected from the group consisting of a reinforcing doubler element and a tension band arranged and non-integrally secured onto said profile member web.

27. The stiffening profile structure according to claim 26, wherein said discrete non-integral component is said reinforcing doubler element, which is arranged and secured onto at least one side of said profile member web.

28. The stiffening profile structure according to claim 27, wherein said reinforcing doubler element consists of a different material than said profile member web.

29. The stiffening profile structure according to claim 27, wherein said reinforcing doubler element consists of one of a high strength aluminum alloy and a fiber-reinforced metal laminate.

30. The stiffening profile structure according to claim 27, further comprising at least one of rivets and an adhesive arranged to secure said reinforcing doubler element onto said profile member web.

31. The stiffening profile structure according to claim 26, wherein said discrete non-integral component is said tension band, which is arranged and secured onto said profile member web.

32. The stiffening profile structure according to claim 31, wherein said tension band consists of a different material than said profile member web.

33. The stiffening profile structure according to claim 31, wherein said tension band consists of at least one of high strength steel alloys, titanium alloys, and fiber-reinforced composites.

34. The stiffening profile structure according to claim 31, wherein said stiffening profile member further includes a thickened material portion that integrally protrudes laterally outwardly from one side of said profile member web and that has an opening therein, and wherein said tension band is received and secured in said opening in said thickened material portion.

35. The stiffening profile structure according to claim 31, wherein said profile member web is a split web including two web legs joined to each other while forming an opening therebetween, and wherein said tension band is received and secured in said opening between said web legs.

36. The aircraft fuselage structural shell component according to claim 1, wherein said strengthening elements are respectively secured only to said stiffening profile members and not to said skin sheet.

* * * * *